(12) United States Patent
Spencer et al.

(10) Patent No.: US 7,019,684 B1
(45) Date of Patent: Mar. 28, 2006

(54) PHASE LOCK LOOP CIRCUITRY

(75) Inventors: George R. Spencer, Bedford, NH (US); Walter J. Hicks, Acton, MA (US)

(73) Assignee: Raytheon Company, Waltham, MA (US)

(*) Notice: Subject to any disclaimer, the term of this patent is extended or adjusted under 35 U.S.C. 154(b) by 1826 days.

(21) Appl. No.: 06/623,284

(22) Filed: May 14, 1984

(51) Int. Cl.
*G01S 13/66* (2006.01)

(52) U.S. Cl. .......................... 342/62; 342/89; 342/90; 342/97; 342/98; 342/100; 342/103; 342/199

(58) Field of Classification Search .............. 343/5 AF, 343/7 A, 7 ED; 342/62, 63, 89, 90, 92, 95–103, 342/175, 188, 194, 195, 199; 331/4
See application file for complete search history.

(56) References Cited

U.S. PATENT DOCUMENTS

| | | | | |
|---|---|---|---|---|
| 3,363,858 A | * | 1/1968 | Dobbins et al. | 244/3.14 |
| 3,569,965 A | * | 3/1971 | Bagley | 342/98 |
| 3,707,718 A | * | 12/1972 | Ames | 342/100 |
| 3,938,148 A | * | 2/1976 | Hobson | 342/199 |
| 3,996,588 A | * | 12/1976 | Besson et al. | 342/100 |
| 4,023,169 A | * | 5/1977 | Kolp et al. | 342/199 |
| 4,096,445 A | * | 6/1978 | Hopwood et al. | 331/17 |
| 4,100,545 A | * | 7/1978 | Tabourier | 342/62 |
| 4,107,678 A | * | 8/1978 | Powell | 342/62 |
| 4,179,694 A | * | 12/1979 | Alder | 342/100 |
| 4,216,472 A | * | 8/1980 | Albanese | 342/95 |
| 4,228,434 A | * | 10/1980 | Williamson et al. | 342/100 |
| 4,672,330 A | * | 6/1987 | Floyd et al. | 331/4 |

* cited by examiner

Primary Examiner—John B. Sotomayor
(74) Attorney, Agent, or Firm—Daly,Crowley,Mofford&Durkee, LLP

(57) ABSTRACT

An arrangement for reducing the effect of vibration-induced changes in phase of the first local oscillator in a tracking receiver wherein final detection is accomplished by a synchronous detector in a phase lock loop incorporating a voltage-controlled oscillator is shown to include a differentiator providing a control signal whenever a vibration-induced change occurs, such control signal being applied to cause the time taken for the voltage-controlled oscillator to regain proper phase is reduced to a minimum.

3 Claims, 3 Drawing Sheets

US 7,019,684 B1

PHASE LOCK LOOP CIRCUITRY

The Government has rights in this invention pursuant to Contract No. N00019-78-C-0258 awarded by the Department of the Navy.

BACKGROUND OF THE INVENTION

This invention pertains in general to semiactive radar guidance systems for guided missiles, and in particular to circuitry to compensate for the effects of vibration-induced noise in such guidance systems.

As is known, a semiactive radar seeker in a guided missile employs a so-called "rear receiver" to provide a coherent reference signal for Doppler processing of the target return signal received by the "front" receiver in such a seeker. That is to say, a rear receiver is arranged to respond to signals transmitted from a control radar to provide a coherent local oscillator (LO) signal for the first downconversion mixers in the front receiver.

The frequency of the signal out of the local oscillator is controlled by means of an automatic frequency control/automatic phase control (AFC/APC) tracking loop, referred to hereinafter as a quadricorrelator and described in U.S. Pat. No. 4,228,434 entitled "Radar Receiver Local Oscillator Control Circuit," inventors Williamson et al, issued Oct. 14, 1980 and assigned to the same assignee as the present invention.

It has been determined that vibration-induced noise in the circuitry may be effective to cause the quadricorrelator to switch between either one of two stable states when vibration-induced phase error exceeds the dynamic range of the quadricorrelator. When such switching occurs, a concomitant 180° phase change in the local oscillator signal for the front receiver also occurs with the result that, for a finite period of time, tracking of a target is not possible.

SUMMARY OF THE INVENTION

With the foregoing background of the invention in mind, it is therefore a primary object of this invention to provide a phase lock loop recovery circuit to reduce the time required for a phase lock loop to recover from a 180° phase change in the loop reference signal.

The foregoing and other objects of this invention are generally attained in a guided missile using a semiactive radar guidance system that incorporates a quadricorrelator by providing means for differentiating the quadricorrelator phase detector output signal and providing such differentiated output signal as an aiding impulse to reduce the length of time that is required to restore tracking conditions after a vibration-induced reversal in phase of the coherent reference signal.

BRIEF DESCRIPTION OF THE DRAWINGS

For a more complete understanding of this invention reference is now made to the following description of the accompanying drawings wherein.

DESCRIPTION OF THE PREFERRED EMBODIMENT

It should be noted at the outset that as the contemplated differentiating circuit is designed to compensate for the effects of vibration-induced noise in a tactical semiactive missile guidance system, only those portions of such a system required for an understanding of the invention will be described in detail. Thus, for example, details of decoding and control logic for the rear receiver will not be described. Further, only selected portions of the front receiver will be described in detail and the acquisition mode of operation of the missile will not be described.

Figure 1:
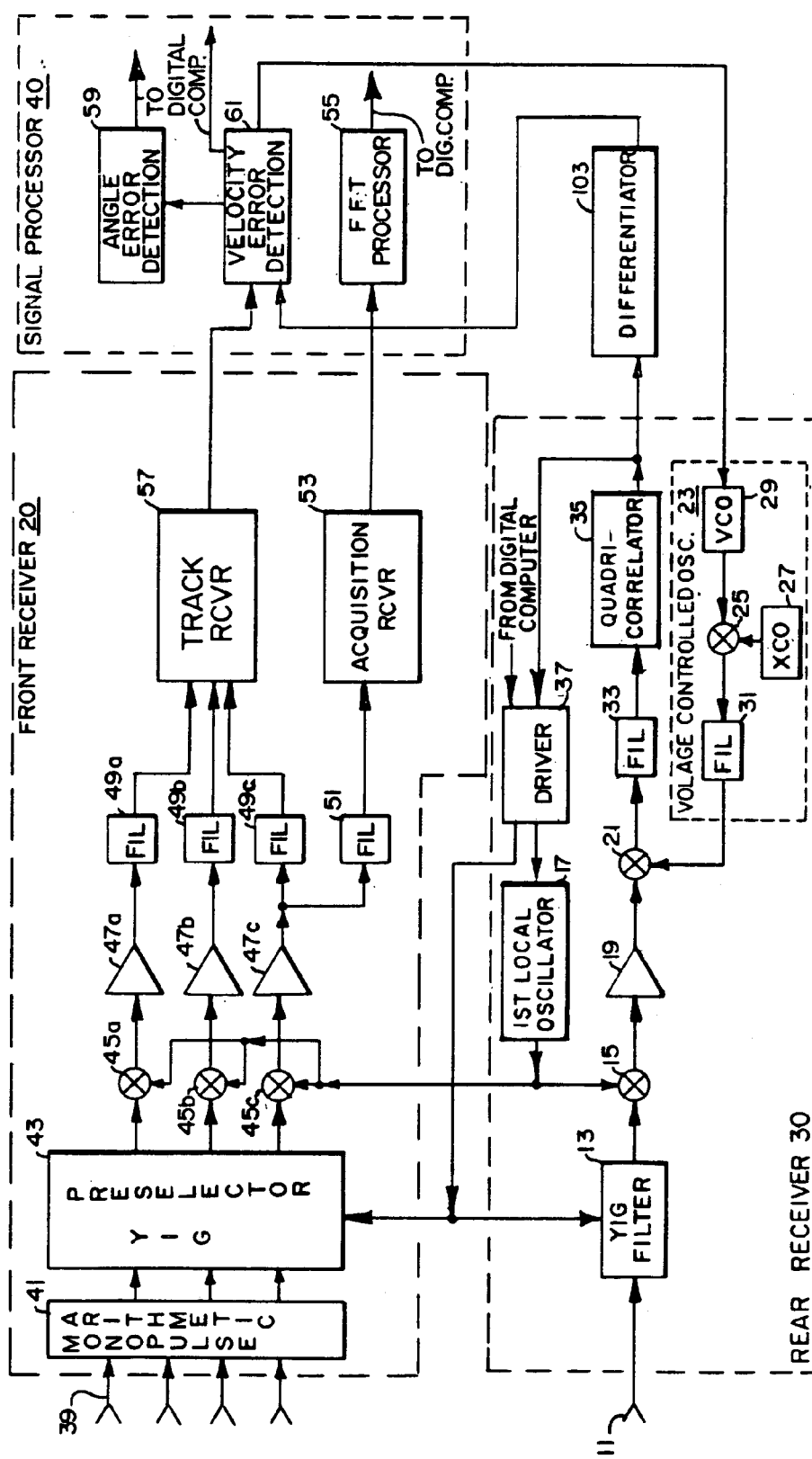
FIG. 1 is a simplified block diagram of a semiactive missile seeker incorporating the invention.

Referring now to FIG. 1, the here relevant parts of a semiactive missile seeker 10 are shown to include a front receiver 20, a rear receiver 30 and a signal processor 40. The rear receiver has a rear antenna 11 for receiving illumination signals from a radar illuminator (not shown) so that a coherent reference signal for Doppler processing of the target return signals received by the front receiver 20 may be generated. Thus, the illuminator signal received by the rear antenna 11 is passed through an electronically tunable filter (here a YIG filter 13) and downconverted to a first intermediate frequency (I.F.) signal at 31 MHz being heterodyned in a balanced mixer 15 with a local oscillator (L.O.) signal obtained from a first local oscillator 17 (described in detail hereinbelow with reference to FIG. 2).

The first I.F. signal from the balanced mixer 15 is amplified in a preamplifier 19 prior to being downconverted to a second I.F. signal at 3.500 MHz by being heterodyned in a balanced mixer 21 with a signal in the band of 34.500±0.080 MHz obtained from a voltage controlled oscillator 23. The specific frequency of the last-mentioned signal, obtained by heterodyning (in a mixer 25) the 34.0 MHz output frequency from a crystal-controlled oscillator 27 with a signal in the band of 500±80 KHz from a voltage controlled oscillator (VCO) 29. The specific frequency out of the VCO 29 is determined by the Doppler error tracking signal obtained from the signal processor 40. The lower sideband of the signal from the mixer 25 is removed in a filter 31 to obtain the signal in the band of 34.500±0.080 MHz.

The second I.F. signal from the mixer 21 is (after, if desired, being subjected to automatic gain control) and passed, via a bandwidth filter 33 having a pass bandwidth of 10 KHz, to a quadricorrelator 35. The filter 33 is provided to remove wideband plume noise, receiver thermal noise and multipath effects. The quadricorrelator 35 will be described in detail hereinbelow with reference to FIG. 2. Suffice it to say here that it is effective to provide an output signal in the form of a D.C. voltage proportional to the phase difference between the second I.F. signal from the filter 33 and a reference frequency. The output signal from the quadricorrelator 35 is provided as a control signal to a driver 37. The latter is effective, in a manner to be described in detail hereinbelow with reference to FIG. 2, to close the APC loop (not numbered) through the reference oscillator 17.

The front receiver 20 is shown to include a monopulse antenna 39, the output signals from which are passed to a monopulse arithmetic network 41 wherein the monopulse sum signal and pitch and yaw difference signals are formed. Such sum and difference signals are passed, via a three channel tuned preselector 43 (an yttrium-iron-garnet electronically tuned filter, YIG) that is controlled by a control signal provided by the driver 37, to balanced mixers 45a, 45b, 45c for downconversion to first I.F. signals at a first I.F. frequency of 31 MHz by being heterodyned with the L.O. signal from the reference oscillator 17. Such first I.F. signals are amplified in preamplifiers 47a, 47b, 47c prior to being filtered in narrowband crystal filters 49a, 49b, 49c. It should be noted the sum channel signal from the preamplifier 47C is split, with a portion being applied, via a narrowband crystal filter 51 to an acquisition receiver 53. The latter is here of conventional design and performs, inter alia, the functions of downconverting to a second I.F. frequency, automatic gain control, and quadrature detection not required for an understanding of this invention. The in-phase (I) and quadrature phase (Q) output signals from the acquisition receiver 53 are passed to a fast Fourier transform (FFT) signal processor 55 within the signal processor 40. The output signals from the FFT signal processor 55 are passed to a digital computer (not shown).

The monopulse sum and difference signals from the narrowband filters 49a, 49b, 49c are passed to a track receiver 57. Within the latter the pitch and yaw difference signals are phase shifted to be in quadrature with the sum signal and then are fed to a pair of double-sideband, suppressed-carrier modulators for mixing with separate reference signals of 7.0 and 10.6 KHz, respectively. The signals out of the modulators 45a, 45b (sometimes called radar error signals) are then algebraically added to the sum signal. The encoded sum signal is then amplified in an AGC amplifier and downconverted to an encoded signal at a second I.F. frequency of 40 KHz by being heterodyned in a balanced mixer with the output from a temperature-compensated crystal oscillator operating at a frequency of 31.040 MHz. The encoded sum signal at the second I.F. frequency is passed to the signal processor 40 to be applied to a velocity network 61, with one signal out of such network being passed, as shown, to an angle decoding network 59. The angle error decoding network 59 is of conventional design to synchronously detect the pitch and yaw radar error sidebands on the sum signal. The pitch and yaw error signals from the angle error decoding network 59 are passed to the digital computer (not shown) to provide input signals for the derivation of guidance signals for achieving a target intercept. The velocity error detection network 61 here comprises a switchable bandwidth phase lock loop, which will be described in detail with reference to FIG. 3. Suffice it to say here the velocity error detection network 61 provides a Doppler error signal that is used to control the VCO 29 in the rear receiver 30, thereby to close the missile Doppler tracking loop (not numbered).

Figure 2:
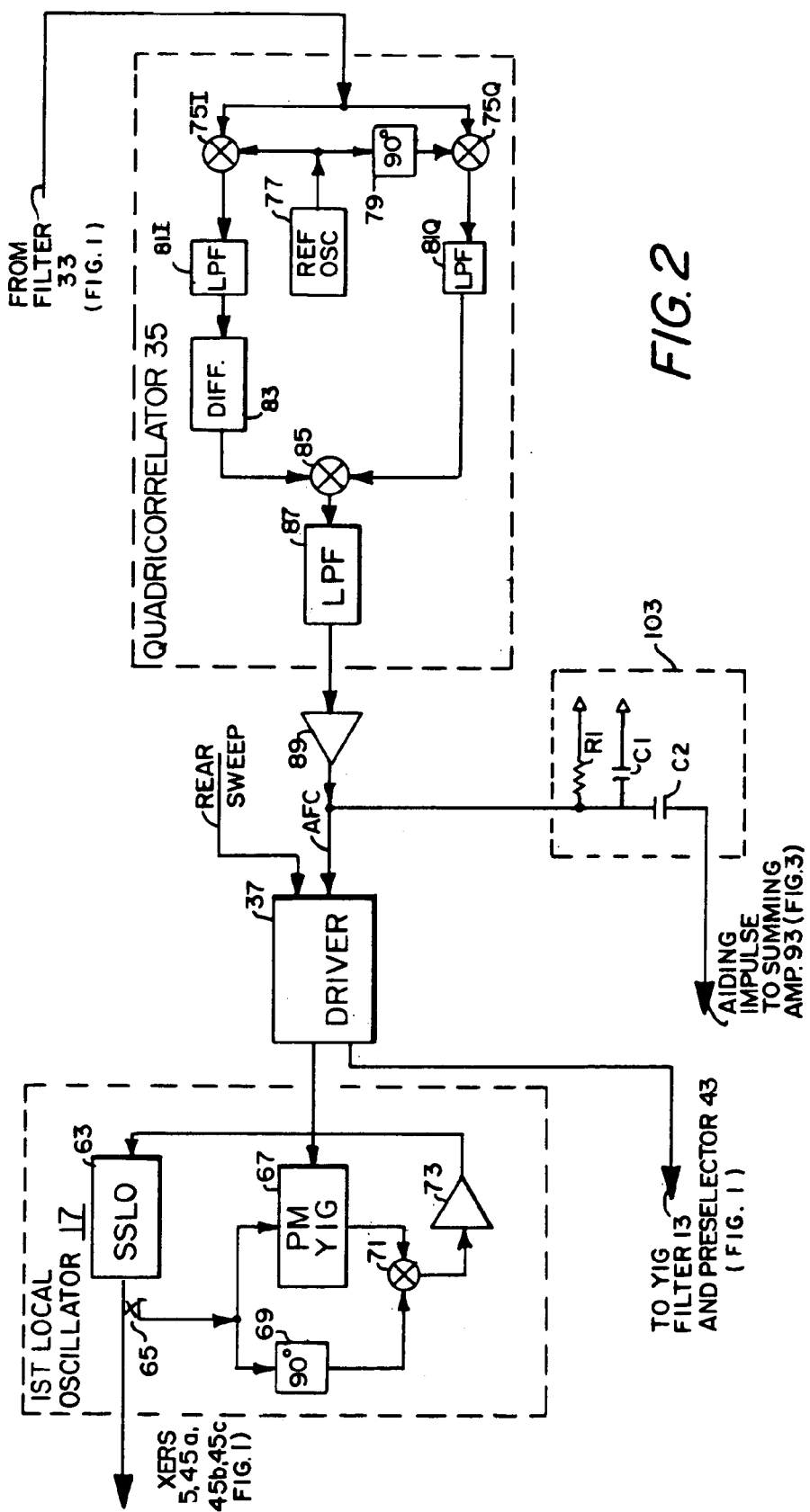
FIG. 2 is a block diagram of the stable rear reference oscillator and quadricorrelator discriminator of FIG. 1 including a differentiating circuit, according to this invention, for providing an aiding impulse to the Doppler tracking phase lock loop of the front receiver of FIG. 1.

Referring now to FIG. 2, the reference oscillator 17 (FIG. 1) is shown to include a voltage tuned solid state local oscillator (SSLO 63) and circuitry (not numbered) for stabilizing the SSLO 63. A portion of the output signal from the SSLO 63 is coupled, via a coupler 65, to a permanent magnet YIG filter 67, a 90° phase shifter 69, and a phase detector 71. The output signal from the phase detector 71 is passed, via a video amplifier 73, as a control signal to the SSLO 63. As previously mentioned, the quadricorrelator 35 provides an AFC control signal, via the YIG driver 37, to the reference oscillator 17. Such control signal is applied to the permanent magnet YIG filter 67 and is effective to tune the bandpass response of the latter. As the center frequency of the permanent magnet YIG filter changes in response to the AFC control signal, the frequency of the SSLO follows so that it remains at the same center frequency. The YIG driver 37 is effective to shift the bandpass response of both the YIG filter 13 (FIG. 1) and the three channel YIG preselector 43 (FIG. 1) to track the frequency changes of the SSLO 63. Such tracking is required so that the first I.F. signals in the front receiver 20 (FIG. 1) will fall within the narrow bandwidth of the crystal filters 49a, 49b, 49c, and 51 (FIG. 1).

The quadricorrelator 35 comprises a pair of quadrature phase detectors 75I, 75Q fed with a reference signal from a crystal controlled reference oscillator 77. The requisite quadrature relationship is realized by phase shifting the reference signal provided to phase detector 75Q in a 90° phase shifter 79. The output signals from the phase detectors 75I, 75Q are filtered by low pass filters 81I, 81Q. The output signal from the low pass filter 81I is passed to a differentiator 83 to phase shift, by 90°, signals within its passband. The output signal from the differentiator 83 is synchronously detected in a detector 85 where the output signal from the low pass filter 81Q serves as a reference signal. The output signal from the detector 85 is integrated in a narrowband low pass filter 87 to become the output signal of the quadricorrelator 35. It will be noted that the magnitude of the output signal of the quadricorrelator is determined by the response of the differentiator 83 and the polarity of such output signal is determined by the relative phase of the signals applied to the synchronous detector 85.

It will be appreciated that the quadricorrelator 35, when a target is being tracked, may be deemed to provide a D.C. signal proportional to the phase difference between the 40 KHz second I.F. input signal from the filter 33 (FIG. 1) and the signal from the crystal-controlled reference oscillator 77 and that such D.C. signal is at a zero volt D.C. level when such signals are in phase or 180° out-of-phase (i.e., the quadricorrelator 35 has two stable states). It has been found that a vibration-induced phase error exceeding 90° will cause the output signal of the quadricorrelator 35 to change from one stable state to the other with a concomitant 180° change in the output signal from the first local oscillator 17 (FIG. 1).

The output of the quadricorrelator 35 is amplified in a video amplifier 89 and applied as a D.C. error control voltage to the driver 37. The latter also receives a sweep control signal from the rear receiver control logic network (not shown).

Figure 3C:
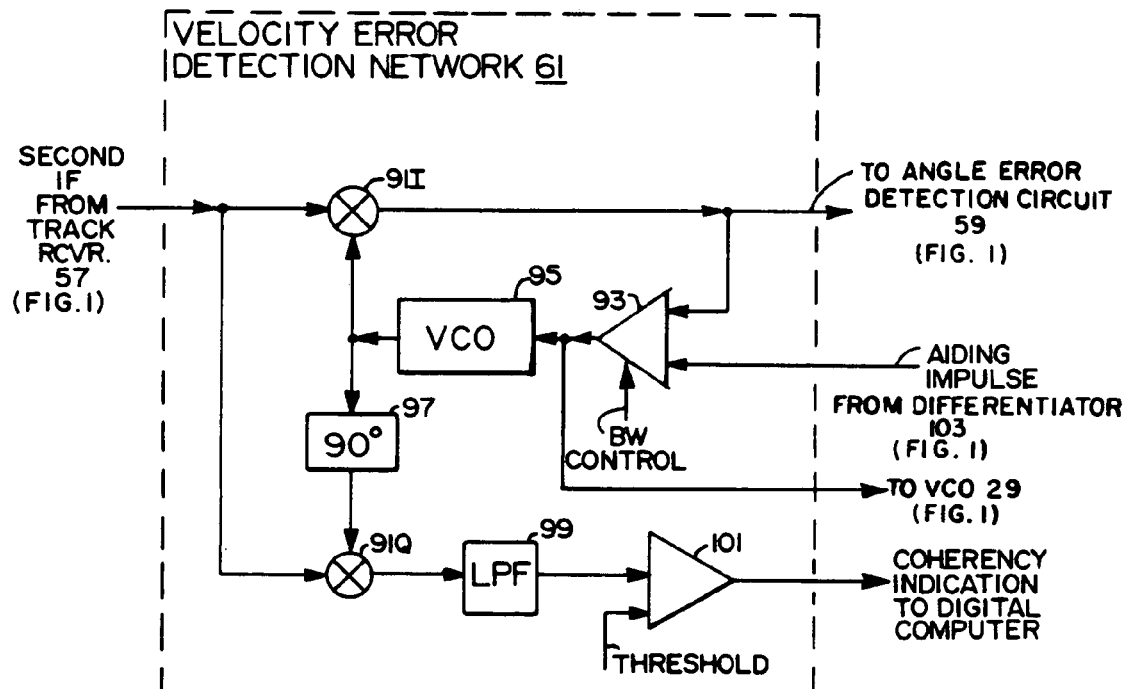
FIG. 3 is a simplified block diagram of the Doppler tracking loop of the front receiver of FIG. 1.

Referring now to FIG. 3, the velocity error detection network 61 is shown to comprise a conventional phase lock loop (PLL) (not numbered) including a pair of phase detectors 91I, 91Q, a summing amplifier 93, a VCO 95, a 90° phase shifter 97, a low pass filter 99 and a comparator 101. The PLL (not numbered) serves to provide an indication (COHERENCY INDICATION) of the detection of a coherent target to the digital computer (not shown). Such indication is accomplished by monitoring the output of the quadrature phase detector 91Q (which correlates the sum signal at 40 KHz from the track receiver 57 (FIG. 1) to the phase shifted output of the VCO 95), filtering the output of the quadrature phase detector 91Q in the low pass filter 99 and providing the filtered output as an input to the comparator 101 along with a threshold signal. If then the level of the filtered signal from the quadrature phase detector 91Q exceeds the threshold signal applied to the comparator 101, the COHERENCY INDICATION signal is formed for the digital computer (not shown).

The PLL (not numbered) also provides a Doppler error output signal proportional to the difference between the free running frequency of the VCO 95 and the sum channel input signal, i.e., the second I.F. signal out of the track receiver 57 (FIG. 1). The level of the signal out of the phase detector 91I is a direct indication of the frequency offset of the VCO 95 required to maintain phase lock, and therefore it is a direct indication of the target Doppler offset from the center of the band of the track receiver 57 (FIG. 1). When coherency is established, the bandwidth of the PLL is reduced by means of a control signal applied to the summing amplifier 93 by the digital computer (not shown) to aid in NOISE JAMMER discrimination. As mentioned hereinabove, the Doppler error signal then is utilized to control the reference oscillator 17 (FIG. 1) to maintain target tracking.

Recalling here that a vibration-induced phase error exceeding the 90° will cause the output of the quadricorrelator 35 (FIG. 2) to switch from one stable state to the other with a concomitant reversal in the phase of the signal out of the first local oscillator 17, it will be appreciated that such a phase reversal ultimately will result in a corresponding reversal in phase of the second I.F. signal applied to the velocity error detection network 61 of the COHERENCY INDICATION signal to the digital computer (not shown). The bandwidth control signal to the summing amplifier 93 then is switched from 60 Hz to 250 Hz until the COHERENCY INDICATION is again formed.

Figure 4U:
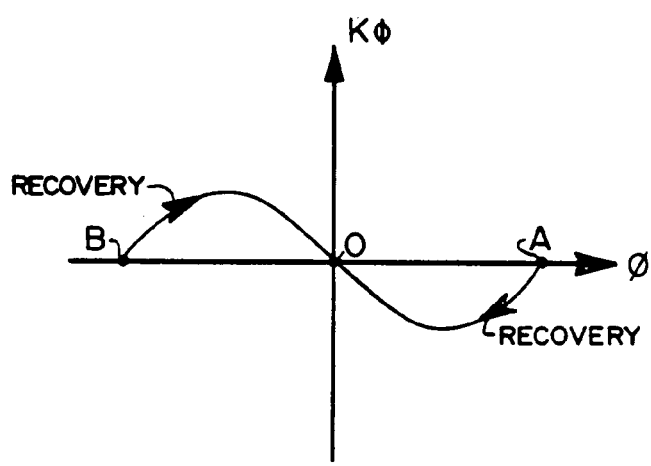
FIG. 4 is a sketch useful in understanding the operation of this invention.

Referring now to FIGS. 3 and 4, the effect of such a 180° phase shift is illustrated. Thus, when the COHERENCY INDICATION signal is sent to the digital computer (not shown) the PLL is locked at the point 0. A positive 180° phase shift in the 40 KHz second I.F. input signal will cause the PLL (not shown) to shift to point A and a negative 180° phase shift will cause a shift to point B. The polarity of the phase shift is dependent upon the polarity of the output signal from the synchronous phase detector 85 in the quadricorrelator 35. In any event, a finite recovery time is required for the PLL (not numbered) to recover to its correct phase sense. Obviously, as target track is lost during this recovery period, it would be advantageous to minimize that recovery time. This is accomplished here by providing an aiding impulse to the summing amplifier 93 in order to more rapidly tune the VCO 95 thereby to aid the PLL (not numbered) to recover to its correct phase sense.

Referring back now for a moment to FIG. 2, the aiding impulse for the summing amplifier 93 (FIG. 3) is developed by differentiating, in a differentiator 103, the amplified D.C. output of the synchronous detector 85. The differentiator 103 is shown to include a resistor R1 and a pair of capacitors C1 and C2. Those components are chosen to limit the amplitude of the aiding impulse to the summing amplifier 93 (FIG. 3) thereby to provide the equivalent energy of a 180° phase shift. In a differentiator that was built and successfully tested resistor R1 had a value of 5,000 ohms, capacitor C1 had a value of 0.015 microfarads, and capacitor C2 had a value of 0.22 microfarads. It should be noted here that the differentiator 103 does not alter the performance of the velocity error detection network 61 (FIG. 3) when the quadricorrelator 35 is operating properly because the input to the differentiator 103 then is equal to a D.C. zero level.

Having described a preferred embodiment of this invention, it will now be evident to one of skill in the art that the embodiment may be changed without departing from the inventive concepts. Thus, for example, if the circuitry (FIG. 3) for generating the coherency indication is rendered impervious to the effect of switching of the quadricorrelator from one stable state to the other, then the control signal, i.e., the aiding impulse (FIG. 3) and summing amplifier (FIG. 3) would not be necessary. It is felt, therefore, that this invention should not be restricted to the disclosed embodiment, but rather should be limited only by the spirit and scope of the appended claims.

What is claimed is:

1. In a semiactive radar guidance system for a guided missile, such system including a heterodyne receiver wherein the frequency of a first local oscillator is required to be rendered coherent with the frequency of echo signals from a target being tracked by a frequency control signal from automatic frequency control circuitry, such circuitry being susceptible to vibration during flight to assume one of two stable conditions, the first of such conditions being one in which the frequency control signal has the proper amplitude and polarity to maintain coherency and the second of such conditions being one in which the polarity of the frequency control signal has an incorrect polarity, the improvement comprising:
   (a) first means, responsive to vibration-induced changes in the automatic frequency control circuitry from one stable condition to the other, for generating a control signal indicative of such change; and
   (b) second means, responsive to the control signal, for correcting the polarity of the frequency control signal.

2. The improvement as in claim 1 wherein the first means is a differentiator responsive to change in the polarity of the frequency control signal.

3. The improvement as in claim 2 wherein the second means comprises a phase lock loop incorporating the combination of a synchronous detector having a first and a second input and an output terminal, a voltage controlled oscillator and a narrow band summing amplifier, a signal representative of a target being tracked being applied to the first input terminal, the output signal of the voltage controlled oscillator being connected to the second input terminal, the summing amplifier being disposed in circuit between the output terminal and the voltage controlled oscillator with the control signal applied to a second input terminal of such amplifier.

* * * * *

UNITED STATES PATENT AND TRADEMARK OFFICE
CERTIFICATE OF CORRECTION

PATENT NO. : 7,019,684 B1 Page 1 of 1
APPLICATION NO. : 06/623284
DATED : March 28, 2006
INVENTOR(S) : Spencer et al.

It is certified that error appears in the above-identified patent and that said Letters Patent is hereby corrected as shown below:

Column 1, line 4 delete "Contract No. N00019-78-C-0258" and replace with --Contract No. N00019-81-C-0103.--.

Column 3, line 37 delete "angle decoding network 59." and replace with --angle error decoding network 59.--.

Column 3, lines 46-47 delete "Suffice it to say here" and replace with --Suffice it here to say--.

Column 6, line 44 delete "being tracked being applied" and replace with --being tracked and being applied--.

Signed and Sealed this

Twenty-second Day of August, 2006

JON W. DUDAS
*Director of the United States Patent and Trademark Office*